United States Patent
Sommer

(10) Patent No.: US 7,274,912 B2
(45) Date of Patent: Sep. 25, 2007

(54) METHOD FOR REGULATING TRANSMISSION POWER IN A RADIO SYSTEM

(75) Inventor: Volker Sommer, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 566 days.

(21) Appl. No.: 10/343,184

(22) PCT Filed: Jul. 19, 2001

(86) PCT No.: PCT/DE01/02732

§ 371 (c)(1),
(2), (4) Date: Jan. 28, 2003

(87) PCT Pub. No.: WO02/11310

PCT Pub. Date: Feb. 7, 2002

(65) Prior Publication Data

US 2003/0148781 A1      Aug. 7, 2003

(30) Foreign Application Priority Data

Jul. 28, 2000   (DE)   ................ 100 36 930

(51) Int. Cl.
*H04B 1/00*   (2006.01)
*H04B 7/00*   (2006.01)

(52) U.S. Cl. ............ 455/69; 455/522; 455/13.4; 455/70; 455/127.1; 455/226.1; 455/423; 455/513; 455/526; 455/561; 455/343.1; 370/311

(58) Field of Classification Search ............ 455/69, 455/522, 13.4, 70, 127.1, 127.5, 226.1, 226.2, 455/226.3, 423, 507, 513, 526, 560, 561, 455/343.1, 343.5; 370/311
See application file for complete search history.

(56) References Cited

U.S. PATENT DOCUMENTS

| | | | |
|---|---|---|---|
| 5,839,056 A * | 11/1998 | Hakkinen | ............ 455/69 |
| 5,987,333 A | 11/1999 | Sole | |
| 6,173,162 B1 * | 1/2001 | Dahlman et al. | ........ 455/69 |
| 6,351,651 B1 * | 2/2002 | Hamabe et al. | ....... 455/522 |

(Continued)

FOREIGN PATENT DOCUMENTS

DE    198 21 519 A1    11/1999

(Continued)

OTHER PUBLICATIONS

Wen et al., "Performance of Short-Term Fading Prediction-Based Power Control Method for DS-CDMA Cellular Mobile Radio Networks", IEICE Trans. Commun., vol. E81-B, No. 6, Jun. 1998, pp. 1231-1237.

*Primary Examiner*—Nick Corsaro
*Assistant Examiner*—Shaima Q. Aminzay
(74) *Attorney, Agent, or Firm*—Staas & Halsey LLP

(57) ABSTRACT

A method regulates the transmission power of a transmitter in a radio system, for a transmission of data to a receiver by a radio interface. The receiver determines an actual value for a qualitative parameter of the received signal, makes a comparison with a set value and, thereafter, transmits comparison information on the result of the comparison to the transmitter. Adjustment of the transmission power of the transmitter is made based on a correction value for the set value of the qualitative parameter of the received signal, in addition to comparison information from the receiver.

12 Claims, 1 Drawing Sheet

U.S. PATENT DOCUMENTS 6,490,461 B1 * 12/2002 Muller .................... 455/522
6,564,067 B1 *  5/2003 Agin ...................... 455/522
6,628,924 B1 *  9/2003 Miyamoto ................ 455/69
6,711,150 B1 *  3/2004 Vanghi ................... 370/342
6,748,232 B1 *  6/2004 Anderson et al. ......... 455/522

FOREIGN PATENT DOCUMENTS

WO    WO98/58461    12/1998

* cited by examiner

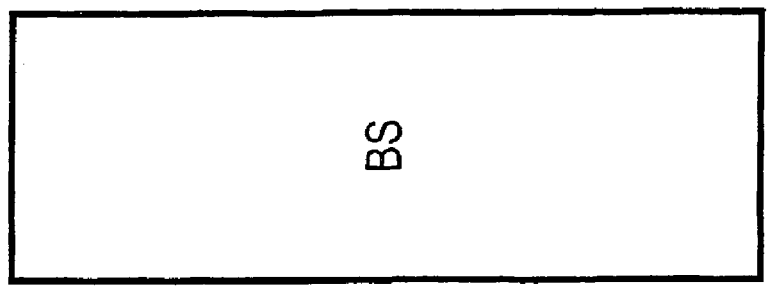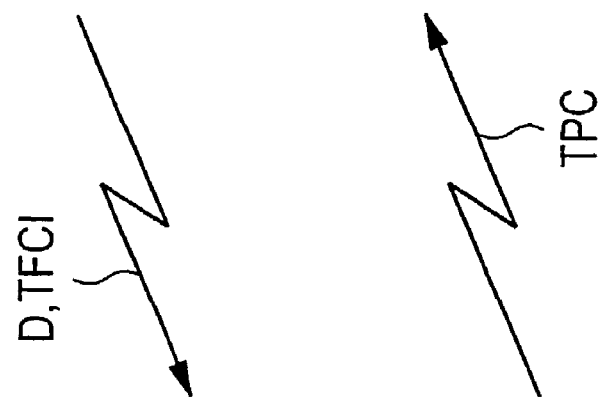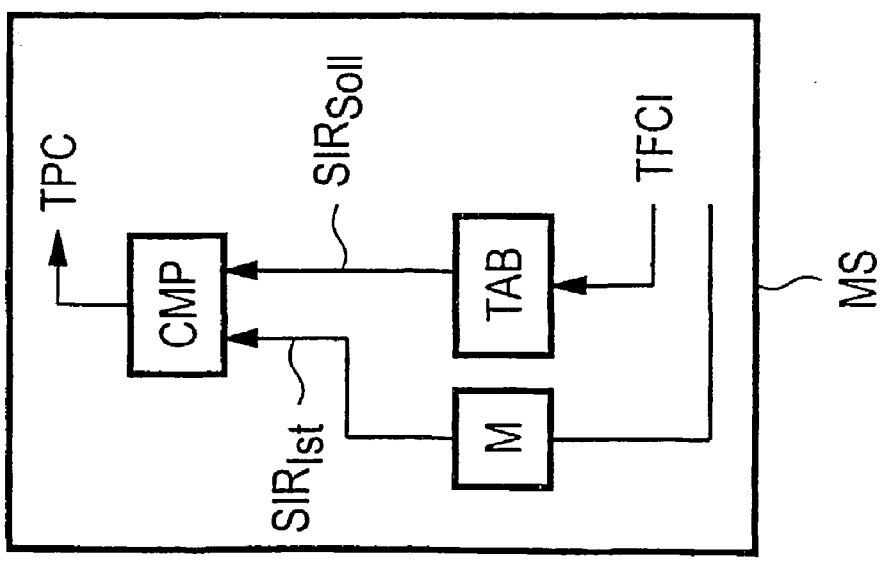

METHOD FOR REGULATING TRANSMISSION POWER IN A RADIO SYSTEM

CROSS REFERENCE TO RELATED APPLICATIONS

This application is based on and hereby claims priority to PCT Application No. PCT/DE01/02732 filed on 19 Jul. 2001 and German Application No. 100 36 930.8 filed on 28 Jul. 2000, the contents of which are hereby incorporated by reference.

BACKGROUND OF THE INVENTION

The invention relates to a method for regulating transmit power in a radio system. The invention is suitable in particular for use in a third-generation mobile radio system, but is not restricted to mobile radio systems.

The most widespread mobile radio system is GSM (global system for mobile communications), which was developed for a single service, i.e. voice transmission. The GSM mobile radio system is referred to as a 2nd-generation system.

In contrast to this, a plurality of services, which are intended to be transmitted within one transmission protocol via commonly used physical channels, are provided for its successor, the 3rd mobile radio generation, which is currently being standardized in Europe under the name UMTS (universal system for mobile communications).

The standardization documents ETSI SMG2/UMTS L23 expert group, Tdoc SMG2 UMTS-L23 357/98, dated 6.10.1998, Tdoc SMG2 508/98 and Tdoc SMG2 515/98, dated 16.11.1998, provide an overview of the current state of development of standardization and, in particular, of the requirements describing how a transmission protocol can support the transport of data of a plurality of services.

The use of a common physical channel for the transmission of data of a plurality of services requires a unique mapping rule to specify the allocation of the services to different segments of the physical channel. A physical channel is defined, for example, by a frequency band, a spread code (CDMA code division multiple access) and, if necessary, a time slot within a frame.

The following terms are used to describe the mapping rule:

Transport Format (TF):

A transport format defines a data rate, a coding, an interleaving, a data rate adaptation through punctuation and an error-protection rule of a transport channel for a service.

Transport Format Set (TFS):

This refers to a set of possible transport formats, which are permitted for a special service.

Transport Format Combination (TFC):

This term indicates a possible combination of transport formats of the different services which are mapped onto a common physical channel.

Transport Format Combination Set (TFCS):

This refers to a set of possible TFCs as a subset of all TFCs which are permitted for a special connection.

Transport Format Combination Identifier (TFCI):

This information indicates the currently used combination of transport formats within the TFCS.

Examples of the transport formats can be found in ETSI SMG2/UMTS L23 expert group, Tdoc SMG2 UMTS-L23 357/98, dated Jun. 10, 1998, pp. 14-16.

TFC modifiability and therefore regular signaling of the TFCI are required for user-oriented selection of the currently used combination of transport formats of the different services.

CDMA separation of the different channels is used in 3rd-generation mobile radio transmission systems. In order to achieve different data rates with the resources available on the air interface, the spreading of the data which are to be transmitted is variable. In order to achieve flexible spreading of this type, for example, either redundant data bits can be added as part of the channel coding, or data bits can be removed ("repetition"=expansion or "puncturing"=compression of data). Flexible spreading is also achieved by modifying the spreading factors of the CDMA spread codes which are used. If the current TFC is modified, this normally results in a modification of the spreading of the data to be transmitted. "Rate matching" can be achieved through the different spreading of the data, i.e. the available channel capacity is optimally utilized by the data to be transmitted.

In order to guarantee transmission quality which is as constant as possible (determined e.g. as the bit error rate or signal-to-noise or signal-to-interference ratio) at the minimum transmit power, feedback power regulation is required, in which the receiver transfers information to the transmitter relating to the required transmit power regulation using the signals received by it. The feedback from the receiver to the transmitter relating to the required adaptation of the transmit power is performed through corresponding signaling, referred to as the "TPC" (Transmit Power Control) bits. To do this, the receiver evaluates the useful signals received from the transmitter, for example, by evaluating the signal-to-noise ratio as a quality parameter of the receive signal.

In a favorable manner, the receiver could obtain the value of this quality parameter required for the respective TFC which is used from the TFCI transferred to it by the transmitter. In the FDD (Frequency Division Duplex) variant of UMTS, the complete TFCI is received at the end of a transmission frame. In the TDD (Time Division Duplex) variant of UMTS, the TFCI is transferred in each time slot. However, particularly with the use of a "joint detector", which performs simultaneous detection of all the spread codes which are used in the radio cell, a certain time passes following receipt of the TFCI before the TFCI is fully decoded. As a result, the receiver may not start the evaluation of the TPC bits for the current time frame until relatively late. The earliest possible time for transfer to the transmitter of the TPC bits determined by the receiver is thus also delayed. In the case of TDD, this results in a minimum spacing, which must not be understepped, between the two transmission directions (uplink and downlink). This signifies a restriction in the channel allocation for the transmission directions.

In J-H Wen et al, "Performance of Short-Term Fading Prediction-Based Power Control Method for DS-CDMA Cellular Mobile Radio Networks", a method is described which takes into account the short-term fading of the transmission signal when regulating the transmit power of a base station.

In DE 198 21 519 A1, the ratio of receive power to noise power is determined in the receiver of a mobile part, is compared with a set value and a signaling bit is transmitted to a base station depending on the result of the comparison. The signaling bit is then used to calculate the current or updated transmit power.

In U.S. Pat. No. 5,987,333, a multichannel communications system is described in which, using an iterative method, the transmit power is monitored for each channel in such a way that a predefined minimal signal-to-noise plus signal-to-interference ratio (SNIR) is attained for the channels.

SUMMARY OF THE INVENTION

One possible object of the invention is to indicate a method and a radio system in which the determination of the information relating to the necessary adaptation of the transmit power of the transmitter in the receiver is less severely delayed.

The method for regulating the transmit power of a transmitter in a radio system for transmission of data to a receiver via a radio interface entails the following steps:
the receiver determines an actual value of a quality parameter of the receive signal and, following a comparison with a set value, transmits comparison information relating to the result of the comparison to the transmitter, and,
when the transmit power of the transmitter is regulated, along with the comparison information transferred by the a correction value for the set value of the quality parameter of the receive signal is additionally taken into account.

The quality parameter of the receive signal may, for example, be the bit error rate determined prior to the decoding of the received data, or the signal-to-noise ratio SNR or the signal-to-interference ratio SIR. The comparison information may, for example, be transferred in the form of the aforementioned TPC bits from the receiver to the transmitter.

A correction value for regulating the transmit power is additionally taken into account along with the comparison information. In known radio systems with feedback transmit power regulation, the transmit power regulation is performed purely on the basis of the transferred comparison information. This offers the advantage that, due to the correction value, circumstances which were not known to the receiver when the comparison information was determined can be taken into account in the transmit power adaptation. This may, for example, be an update, which has become necessary in the interim period, of the set value of the quality parameter required for the set/actual value comparison, which could not be taken into account by the receiver at the time when the comparison was made.

The receiver has no knowledge of the transmit power used by the transmitter, which is selected according to the spreading which is used. The transmitter may modify its transmit power by varying the puncturing, repetition and/or spreading factor. This is the case, for example, in the event of modification of the TFC which is used. If the receive power is modified in the receiver, the latter cannot identify this without corresponding information from the transmitter, indicating whether this modification is due to a deliberate modification of the transmit power or (unwanted) attenuation by the transmission channel.

Conversely, the transmitter knows, for example, why it modifies a transport format combination or the spreading for the data which are to be transmitted, and what effects this change will have on the required transmit power. If, for example, the data are spread to a greater extent than before, the transmit power and the set value for the quality parameter of the receive signal can be reduced under constant transmission conditions (attenuation, interference or noise), nevertheless to retain the same receive quality for the data which are to be decoded. The modification of the transmit power and the set value of the quality parameter based purely on the modification of the spreading or expansion/compression is referred to below as the "power offset". The transmitter can take this power offset into account as a correction value for the comparison information of the receiver when regulating the transmit power.

The data may, for example, be transmitted in consecutive time frames, whereby information relating to the set value of the quality parameter of the receive signal is transmitted in a temporally recurring manner to the receiver, and the receiver carries out the set/actual value comparison of the quality parameter in each time frame, in each case using the last set value which was notified with the corresponding information in one of the preceding time frames. This offers the advantage that the receiver can carry out the comparison at a very early stage in the current time frame, since it does not first have to decode the set value transmitted in the current time frame.

It is favorable if the set value information transmitted to the receiver is kept constant in each case for at least two consecutive time frames. Since the receiver always uses the set value of the preceding time frames for the set/actual value comparison, a correction value for the transmit power regulation of the transmitter then needs to be taken into account in only some of the time frames.

If transport formats which are in each case permitted for the transmission of corresponding data are defined for a plurality of services and data of a combination of a plurality of the services are transmitted via a commonly used physical channel, it is favorable to transmit from the transmitter to the receiver information relating to the combination, used in the current time frame, of the transport formats of the services used for data transmission as set value information. The set value is therefore determined from the TFCI, which is transferred in any case to notify the currently used TFC.

When regulating the transmit power for the current time frame, it is favorable to take into account not only the comparison information transferred by the receiver in the preceding time frame, but also a modification of the transport format combination used for the data transmission carried out in the current time frame compared with the preceding time frame. The modification of the transport format combination is therefore also taken into account in the correction value for the transmit power regulation.

When regulating the transmit power for the current time frame, a modification of the transport format combination used, which was carried out in the preceding time frame compared with the latter's preceding time frame can additionally be taken into account.

BRIEF DESCRIPTION OF THE DRAWINGS

These and other objects and advantages of the present invention will become more apparent and more readily appreciated from the following description of the preferred embodiments, taken in conjunction with the accompanying drawings of which:

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The FIGURE shows a base station BS and a mobile station MS of a UMTS mobile radio system. The adaptation of the transmit power of the base station BS is considered below, although the invention is also applicable to the adaptation of the transmit power of the mobile station MS and other devices. The base station BS transfers data D of a plurality of services (e.g. a voice service, a fax service, an e-mail service and/or a different data service), corresponding to a predefined transport format combination (TFC), to the mobile station MS. Furthermore, it transmits a TFC identifier (TFCI) to the mobile station MS. Using the TFCI, the mobile station is able to recognize the currently used TFC. To do this, a corresponding table TAB is stored in a corresponding memory in the mobile station MS, containing all permissible TFCs. The TFCI refers to an entry in this table TAB and thus identifies the TFC which is used.

The table TAB stored in the mobile station MS furthermore contains a set value $SIR_{Soll}$ corresponding to the relevant TFC for the signal-to-interference ratio of the signals received by the mobile station MS. On the basis of the different spreading of the data in the different TFCs, this set value is likewise different in each case for each permitted TFC. The mobile station MS determines the actual value $SIR_{1st}$ of the data D transmitted by the base station with a corresponding measuring device M. This can be done e.g. through mean value formation over part of the current time frame. It then carries out a set/actual value comparison of the SIR with a comparison unit CMP. As the result of this comparison, the mobile station MS transfers TPC (Transmit Power Control) bits to the base station BS, which are used there to adapt the transmit power. However, the adaptation of the transmit power of the base station BS is not carried out purely on the basis of the TPC bits transferred to the base station. A correction value for the power adaptation is additionally taken into account, and this will be considered below.

In the mobile station MS, the TFCI of the current frame occurs so late that evaluation of the TFCI and determination of the associated set value $SIR_{Soll}$ before the time of the set/actual value comparison would result in an excessive time delay.

In each time frame, the mobile station MS therefore uses the TFCI of the preceding frame in order to determine the set value $SIR_{Soll}$ for the set/actual value comparison. It then has sufficient time to determine the respective next set value $SIR_{Soll}$ with the aid of the stored table TAB from the TFCI which it has previously detected. The mobile station MS is thus able to signal the necessary power adaptations without substantial time delays. As a result, however, with a modification of the TFC which is signaled by the TFCI in the current frame, the mobile station always uses an "out-of-date" set value $SIR_{Soll}$ for the comparison, i.e. the value from the respective preceding frame. For this reason, a correction value for the adaptation of the transmit power is taken into account in the base station, along with the TPC bits transferred by the mobile station MS, taking into account the modification of the TFC, which has not yet affected the set value $P_{Soll}$ required by the mobile station for the set/actual value comparison. The "error" caused by the mobile station MS in its set/actual value comparison is corrected in the base station BS by this correction value. This correction value can be determined without difficulty, since the modification of the TFC of the base station BS, which itself carries out this modification, is of course known.

The transmit power is regulated in the base station in the embodiments considered here according to the following algorithm:

A "reference TFC" is first defined in a first step. This is understood below to refer to a specific TFC which is selected at random from the permitted TFCs (these are the TFCs stored in the table TAB of the mobile station MS). A specific base station transmit power is determined (depending on the channel quality), which is used as the reference transmit power for the other TFCs for error-free transmission of the data with this reference TFC. The transmit power for the transmission of the data of the other TFCs is therefore indicated below relative to that of the reference TFC as the "(power) offset". This offset is produced due to the different spreading of the data of the different TFCs, resulting from different puncturing, repetition or different spreading factors. The offset is constant, independent of the channel quality for each TFC. The offset may also be the same for a plurality of TFCs.

Following the definition of the reference TFC and the offsets for the transmit power for all permitted TFCs, the transmit power is determined as follows for each transmission frame:

"Case 1": If the offset of the transmit power, related to the reference TFC, was greater in the preceding frame than in the frame before that and, furthermore, a reduction in the transmit power is required with the TPC bits of the preceding frame, even though the amount of the required reduction is less than the transmitted difference between the power offsets of the two consecutive frames, the transmit power in the current frame initially remains unchanged compared to the value in the preceding frame. However, in this case, the TPC bits of the respective next uplink frame in particular are additionally evaluated: If these in turn require a reduction in the transmit power, the latter will be reduced in the following downlink frame by double the required amount. The step size of the transmit power regulation is therefore increased.

Explanation: This response is required, since the base station BS, following the initially received TPC bits, does not know whether the required power reduction was caused merely by the increased transmit power or, additionally, by an improved channel with lower channel attenuation. Finally, the mobile station MS carries out the set/actual value comparison of the SIR with a possibly "out-of-date" set value $SIR_{Soll}$, which relates back to an interim changeover of the TFC which is used. However, even before transmission of the TPC bits of the next frame, the mobile device already knows (through evaluation of the TFCI of the preceding frame) the TFC used by the base station and therefore the associated power offset and the associated set value $SIR_{Soll}$, and can therefore control the required correction of the transmit power in an appropriate manner. By a repeat request for power reduction and the associated reduction by double the amount, a dynamic response can be achieved as if the transmit power had already been reduced in the base station following reception of the TPC bits of the first frame.

"Case 2(a)": If the offset of the transmit power, compared with the reference TFC in the previous frame, was less than the frame before that and a higher transmit power is required with the uplink TPC bits of the previous frame, even though the amount of the increase required by the TPC bits is less than the power reduction which is to be carried out on the basis of the difference between the power offsets of the two frames, the transmit power in the current frame initially remains unchanged compared with the value in the preceding frame. However, in this case the TPC bits of the respective next uplink frame in particular are additionally evaluated: If these in turn require an increase in the transmit power, the latter will be increased in the following downlink frame by double the required amount.

Explanation: This response is required, since the base station, following the first received TPC bits, does not know whether the required power increase was caused merely by the reduced transmit power or, additionally, by a poorer channel (higher attenuation). However, even before transmission of the TPC bits of the next frame, the mobile device already knows (through evaluation of the TFCI) the power offset used by the base station and therefore the signal-to-interference ratio $SIR_{Soll}$, and can therefore deliberately control the required correction of the transmit power. By a repeat request for a power increase and the associated increase by double the amount, a dynamic response can be achieved as if the transmit power had already been increased in the base station following reception of the TPC bits of the first frame.

"Case 2(b)": As an alternative to case 2(a), in a different embodiment, the power adaptation can also be performed for the last-described case according to a modified algorithm in order to ensure, with even higher probability, that a minimum power level is not understepped, even though on average a slightly higher transmit power is set in the base station:

To do this, if the power offset in the previous frame was less than in the frame before that and a higher transmit power is required in the uplink TPC of the previous frame, the transmit power is already increased in the current frame by the value signaled with the TPC bits. In this variant also, the TPC bits in particular are additionally evaluated in the respective next uplink frame: if the latter then requires a reduction in the transmit power by a specific step, the power is reduced in the following downlink frame by double the amount.

"Case 3": In all other cases, the transmit power is increased, maintained or reduced according to the value of the TPC bits signaled in the previous frame, additionally by the difference in the power offsets from the current frame in relation to the respective previous frame, due to a possible changeover of the TFCs.

The aforementioned algorithm can be expressed as a formula, using the following notations:

T: Number of the current frame

P(T): Transmit power in the current frame $P_{Off}(T)$: Additional offset of the transmit power in the current frame due to variable spreading, relative to a pre-defined "reference TFC" ($P_{Off}=0$ corresponds to the transmit power of the reference TFC)

$\Delta P_{Off}(T) := P_{Off}(T) - P_{Off}(T-1)$ $P_{TPC}(T)$: Power modification for the receive power in the time frame T signaled by the TPC bits of the first frame following T in the opposite direction These notations produce the following equations, which describe the modification of the transmit power depending on the spreading, which may differ for each TFC (resulting in a corresponding offset compared with the reference TFC), and of the TPC bits (the specified cases refer to the above numbering, and either case 2(a) or case 2(b) may be used in different embodiments):

Case 1:

if $\Delta P_{Off}(T-1) > 0$ $\lambda$ $-\Delta P_{Off}(T-1) < \Delta P_{TPC}(T-1) < 0$ $P(T) = P(T-1)$ if, additionally, $P_{TPC}(T) < 0$ $P(T+1) = P(T) + 2P_{TPC}(T)$ Case 2a:

if $\Delta P_{Off}(T-1) < 0$ $\lambda$ $-\Delta P_{Off}(T-1) > \Delta P_{TPC}(T-1) > 0$ $P(T) = P(T-1)$ if, additionally, $P_{TPC}(T) > 0$ $P(T+1) = P(T) + 2P_{TPC}(T)$ Case 2b:

if $\Delta P_{Off}(T-1) < 0$ $\lambda$ $P_{TPC}(T-1) > 0$ $P(T) = P(T-1) + P_{TPC}(T-1)$ if, additionally, $P_{TPC}(T) < 0$ $P(T+1) = P(T) + 2P_{TPC}(T)$ Case 3: The following applies in all cases:

$P(T) = P(T-1) + P_{TPC}(T-1) + \Delta P_{Off}(T)$

A specific example will serve to clarify the method. The following table shows, for a period of 16 frames:

the frame number T, the current transmit power P actually set by the base station, relating to any given constant power value, the (spreading-related) power offset $P_{Off}$ of the current TFC in the respective frame, by which the current transmit power P is increased or reduced compared with the transmit power of the reference TFC, the random power modification $\Delta P$(channel attenuation) caused by the channel, the current signal-to-interference ratio $SIR_{1st}$(actual value) received and measured by the mobile device MS, the set value currently used by the mobile station for the signal-to-interference ratio $SIR_{Soll}$, and the transmit power modification $P_{TPC}$ signaled by the mobile device following the set/actual value comparison of the signal-to-interference ratio by the TPC bits, which is to be carried out by the base station.

For the sake of simplification, a constant interference of 0 dB is assumed, and the SIR set value is furthermore defined as $SIR_{Soll}=0$ dB for the reference TFC.

The current set value $SIR_{Soll}$ corresponds to the power offset $P_{Off}$ used by the base station BS in the immediately preceding frame, since the mobile station can only evaluate the TFCI which is then completely transferred with a one-frame delay, and can determine the set value $SIR_{Soll}$ therefrom with the aid of the table TAB stored in the mobile station. It can therefore be said that the set value is always one frame "out-of-date". Conversely, $SIR_{1st}$ is instantly measurable, since no decoding of the received data is required, which is not possible until all data of a frame have been received. Since the respective TFC which is used is maintained constant for at least two consecutive frames, the correct set value for this TFC is known to the mobile station following a changeover of the TFCs after two frames at the latest. Since each TFC may have a different power offset $P_{Off}$ compared with the reference TFC, the set values $SIR_{Soll}$ of the remaining TFCs also differ under the same transmission conditions (same channel attenuation, same interference) from the set value of the reference TFC by the value of the respective power offset $P_{Off}$.

All power values in the table below are specified in dB, with modifications in full dB only. In this embodiment, the aforementioned case 2(b) is used. Each TFC is maintained constant for at least two frames, so that the mobile station knows the set value $SIR_{Soll}$ which is actually valid for the currently used TFC, determined from the table TAB stored in the mobile station MS at least in each second frame on the basis of the TFCI of the preceding frame which has since become known. In this example, $P_{TPC}$ may assume the values −1, 0 or 1 only or, alternatively only the two values −1 and 1, for example, are possible in other embodiments:

| T | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $P_{Off}$ | 0 | 0 | 2 | 2 | 2 | 2 | −2 | −2 | 0 | 0 | −2 | −2 | 2 | 2 | 2 | 2 |
| $P_T$ | 0 | 1 | 4 | 4 | 5 | 4 | −1 | 0 | 0 | 0 | −1 | 0 | 5 | 5 | 5 | 5 |
| $\Delta P$ | −1 | −2 | −2 | −3 | −2 | −1 | 0 | 0 | −2 | −4 | −4 | −3 | −3 | −2 | −3 | −4 |
| $SIR_{1st}$ | −1 | −1 | 2 | 1 | 3 | 3 | −1 | 0 | −2 | −4 | −5 | −3 | 2 | 3 | 2 | 1 |
| $SIR_{Soll}$ | 0 | 0 | 0 | 2 | 2 | 2 | 2 | −2 | −2 | 0 | 0 | −2 | −2 | 2 | 2 | 2 |
| $P_{TPC}$ | 1 | 1 | −1 | 1 | −1 | −1 | 1 | −1 | 0 | 1 | 1 | 1 | −1 | 0 | 0 | 1 |

Explanation of the above table:

The reference TFC is transmitted at time T=0. $P_{Off}$=0 applies here. Furthermore, $\Delta P_{Off}(-1)=\Delta P_{Off}(0)=0$ is assumed. The channel causes an attenuation of 1 dB, so that the set value $SIR_{1st}$=−1 dB is measured in the receiver. The receiver compares the actual value with the SIR set value of 0 dB assumed for the reference TFC and then requests an increase in the transmit power, i.e. $P_{TPC}(0)$=1 (corresponding to case 3).

T=1: The reference TFC is again transmitted, but now increased by 1 dB to 1 dB in total due to the TPC bits of the preceding frame which have since been received. The channel effects attenuation on the basis of a channel modification which is caused e.g. by the movement of the mobile station, in this case by 2 dB, so that $SIR_{1st}$=−1 dB is measured in the receiver. $P_{TPC}$=1 is then retransmitted on the uplink following the set/actual value comparison (case 3).

T=2: A changeover of the TFCs which are used is then carried out, whereby the data D are transmitted from the base station BS to the mobile station MS. A $P_{Off}$ of 2 dB is allocated to this new TFC. This means that, under unmodified transmission conditions (attenuation, interference), the transmit power would have to be increased by this power offset of 2 dB entirely on the basis of the TFC changeover. A positive power offset is produced, for example, if the data of the current TFC are less strongly spread or more strongly punctuated than when the reference TFC is used. Due to the received TPC bits of the preceding frame and additional $P_{Off}$=2 dB in comparison with the reference TFC due to additional puncturing of the data to be transmitted (modification of the TFC), the transmit power of the base station is increased to a total of P=4 dB. $SIR_{1st}$=2 dB is then measured in the receiver, so that, in comparison with the unmodified set value $SIR_{Soll}$=0 dB, a required reduction in the transmit power is signaled by the TPC bits (case 3).

T=3: Since the transmit power was increased in the preceding frame, it is not then directly reduced despite the reduction request signaled via the TPC bits of the preceding frame, and remains at 4 dB (case 1). A $SIR_{1st}$ of 1 dB is generated by the channel in the receiver. Since the receiver, through evaluation of the TFCI transferred to it in the last frame, now knows the actual value of the power offset $P_{Off}$ of the currently used TFC and therefore the relevant set value $SIR_{Soll}$ for the signal-to-interference ratio, $P_{TPC}$=1 dB is signaled by it in order to increase the transmit power of the base station BS to the set value of 2 dB.

T=4: Since the additional condition of case 1 is not satisfied and furthermore the power offset $P_{Off}$ has remained unchanged, the transmit power is increased according to case 3 by $P_{TPC}$=1 dB to 5 dB. $SIR_{1st}$=3 dB is measured in the receiver due to the channel attenuation. Since this value is higher than the last known $SIR_{Soll}$ for which it was possible to evaluate the TFCI in the receiver at that time, the power reduction request is sent to the base station BS.

T=5: The power is reduced as requested by 1 dB to 4 dB. An $SIR_{1st}$ of 3 dB is measured in the receiver, so that a reduction is again signaled.

T=6: The TFC is again changed over. The new TFC has a power offset of $P_{Off}$=−2 dB compared with the transmit power of the reference TFC. A negative power offset is achieved, for example, through more substantial spreading or more substantial expansion of the data to be transmitted than in the case where the reference TFC is used. The transmit power is set at P=−1 dB on the basis of the received TPC bits determined on the basis of the data transmitted in the preceding frame and the $P_{Off}$, which is 4 dB lower compared with the previously used TFC. The mobile station MS receives an $SIR_{1st}$ of −1 dB. Since the receiver compares this actual value with an $SIR_{Soll}$ of +2 dB, it requests an increase in the transmit power P via the TPC bits (case 3).

T=7: According to case 2b, the transmit power is directly increased. The receiver then measures $SIR_{1st}$=0 dB which, on the basis of the now known TFCI of the preceding frame, from which $SIR_{Soll}$=−2 dB is derived by the table TAB, results in the power reduction request ($P_{TPC}$=−1 db).

T=8: The TFC is again modified. Since $P_{Off}$=0 dB, this involves either the reference TFC or a different TFC which has no power offset compared with the reference TFC, since, for example, the same spreading is carried out for the data transferred with both TFCs. Since the additional condition of case 2b is satisfied, the transmit power is mathematically reduced by double the TPC amount, but, on the basis of $P_{Off}$, is simultaneously increased by 2 dB, so that P=0 dB is transmitted unchanged. As a result, $SIR_{1st}$=2 dB is measured in the receiver, which corresponds exactly to the set value $SIR_{Soll}$ and produces $P_{TPC}$=0 dB.

T=9: P=0 dB is again transmitted. Due to the channel, whose attenuation is constantly changing, $SIR_{1st}$=−4 dB is measured in the receiver, which then acknowledges with $P_{TPC}$=+1.

T=10: The TFC used is again changed over. The transmit power P of the base station BS is mathematically increased by the 1 dB required by the TPC bits of the preceding frame and is simultaneously reduced by the modified power offset $P_{Off}$ by 2 dB, so that P=−1 dB. $SIR_{1st}$=−5 dB is produced in the receiver. A power increase of 1 dB is then required by the current TPC bits.

T=11: According to case 2b, the transmit power P is increased by 1 dB, whereby $SIR_{1st}$=−3 dB is measured in the receiver, which again transmits $P_{TPC}$=+1 on the basis of the understepping of the set value $SIR_{Soll}$=−2 dB.

T=12: The TFC is again changed over. Since, in this case, the second condition of case 2b is not satisfied, an increase by 1 dB is carried out (on the basis of the TPC bits of the preceding frame), plus 4 dB on the basis of the modified Poff. The $SIR_{1st}$=2 dB which is then measured is higher than the current set value of $SIR_{Soll}$=−2 dB, so that a reduction of the transmit power is signaled via the TPC bits.

T=13: Since case 3 applies, the transmit power P of the base station is not reduced, so that 5 dB is transmitted unmodified, whereby $SIR_{1st}$=3 dB is measured in the receiver. $P_{TPC}$=0 dB is transmitted in order to prevent $SIR_{1st}$ from falling below the set value $SIR_{Soll}$.

T=14: Since the power offset $P_{off}$ has not changed, because the current TFC has not been changed compared with the preceding frame, P=5 dB is transmitted unmodified, thereby producing $SIR_{1st}$=2 dB in the receiver. This corresponds exactly to $SIR_{Soll}$ and in turn produces a $P_{TPC}$ of 0 dB.

T=15: Transmission is repeated with 5 dB, whereby $SIR_{1st}$=1 dB is measured in the receiver and $P_{TPC}$=1dB is again required.

The method and system have been explained above with reference to an embodiment in which the signal-to-interference ratio SIR has been used as the quality parameter of the receive signal. However, the signal-to-noise ratio SNR, for example, or the bit error rate, measured prior to decoding of the received data, can also be used as the quality parameter.

The invention has been described in detail with particular reference to preferred embodiments thereof and examples, but it will be understood that variations and modifications can be effected within the spirit and scope of the invention.

The invention claimed is:

1. A method for regulating the transmit power of a transmitter in a radio system, comprising:
   transmitting data to a receiver in consecutive timeframes via a radio interface;
   repeatedly transmitting a set value of a quality parameter intended for a receive signal, a first set value being transmitted in a first time frame and a second set value being transmitted in a second time frame-subsequent to the first time frame, the first and second set values being transmitted to the receiver from the transmitter;
   repeatedly determining an actual value of the quality parameter for the receive signal, the actual value being determined for the second time frame;
   comparing the actual value of the quality parameter for the second time frame with the first set value of the quality parameter for the first time frame, the comparison producing a result;
   transferring an item of information relating to the result of the comparison from the receiver to the transmitter;
   when there is a change between the set value of the first time frame and the set value of the second time frame, determining a correction value at the transmitter based on the change, and
   correcting the item of information relating to the result using the correction value, the item of information being corrected at the transmitter to produce a power control parameter; and
   regulating transmit power of the transmitter for a third time frame subsequent to the second time frame, based on power control parameter.

2. The method as claimed in claim 1, wherein the set value transmitted to the receiver is maintained constant in each case for at least two consecutive time frames.

3. The method as claimed in claim 2, wherein
   for each of a plurality of services, a transport format defines the permitted data transmission technique,
   combined data associated with a plurality of the services and having a plurality of transport formats is transmitted via a commonly used physical channel, and
   information relating to the transport formats of the combined data is transmitted from the transmitter to the receiver as the set value, the set value being transmitted with the time frame for which the transport formats are used.

4. The method as claimed in claim 3, wherein
   for each of a plurality of services, a transport format defines the permitted data transmission technique,
   combined data associated with a plurality of the services and having a plurality of transport formats is transmitted to the receiver such that the transport format is modified from one timeframe to another,
   the combined data causes a transport format modification such that one data format is used for the second time frame and a different data format is used for a third time frame, subsequent to the first and second time frames, and
   when regulating the transmit power for the third time frame, not only the result of the comparison but also the transport format modification, is taken into account.

5. The method as claimed in claim 1, wherein
   for each of a plurality of services, a transport format defines the permitted data transmission technique,
   combined data associated with a plurality of the services and having a plurality of transport formats is transmitted via a commonly used physical channel, and
   information relating to the transport formats of the combined data is transmitted from the transmitter to the receiver as the set value, the set value being transmitted with the time frame for which the transport formats are used.

6. The method as claimed in claim 1, wherein
   for each of a plurality of services, a transport format defines the permitted data transmission technique,
   combined data associated with a plurality of the services and having a plurality of transport formats is transmitted to the receiver such that the transport format is modified from one timeframe to another,
   the combined data causes a transport format modification such that one data format is used for the second time frame and a different data format is used for a third time frame, subsequent to the first and second time frames, and
   when regulating the transmit power for the third time frame, not only the result of the comparison but also the transport format modification, is taken into account.

7. The method as claimed in claim 6 wherein
   the combined data causes two transport format modifications such that the data format is changed between the first and second time frames and changed between the second and third time frames, and
   when regulating the transmit power for the third time frame, the two transport format modifications are both taken into account.

8. The method as claimed in claim 7, wherein
a modification of the transmit power for the third time frame has two components:
a first component based on the transport format modification between the second and third time frames, and
a second component based on the comparison result, and
the transmit power for the third frame is not modified if the first component has a magnitude which is greater than the second component, and the first and second component have different signs.

9. The method as claimed in claim 8, wherein
the transmit power is modified in discrete steps, and
the step size for the modification of the transmit power in the third time frame is increased if no modification of the transmit power was performed in the second time frame.

10. The method as claimed in claim 7, wherein
a modification of the transmit power for the third time frame has two components:
a first component based on the transport format modification between the second and third time frames, and
a second component based on the comparison result
if the first and second components have different sign bits, the step size for a modification of the transmit power for a forth time frame, which is subsequent to the first through third time frames, is temporarily increased, to the extent that the comparison result determined in the third time frame and the comparison result determined in the second time frame have different sign bits.

11. The method as claimed in claim 1 wherein the correction value corresponds to a difference between the set value of the second time frame and the set value of the first time frame.

12. A radio system comprising:
a transmitter to transmit data in consecutive time frames, and repeatedly transmit a set value of a quality parameter intended for a receive signal, the transmitter transmitting a first set value in a first time frame and a second set value in a second time frame subsequent to the first time frame;
a receiver to:
receive the data and the set value from the transmitter,
evaluate the first and the second time frame,
determine an actual value of a quality parameter of the receive signal for the second time frame,
compare the set value for the first time frame with the actual value of the quality parameter for the second time frame and produce a comparison result, and
transfer an item of information relating to the comparison result to the transmitter, and
a power set unit provided in the transmitter, to set a transmit power for the transmitter, the power set unit operating such that when there is a change between the set value of the first time fame and the set value of the second time frame, and the power set unit determines a correction value based on the change, the power set unit correcting the item of information relating to the comparison result using the correction value, the item of information being corrected to produce a power control parameter, the power set unit setting the transmit power for the transmitter based on the power control parameter.

* * * * *